United States Patent
Weitzel et al.

(10) Patent No.: US 12,024,572 B2
(45) Date of Patent: Jul. 2, 2024

(54) METHOD FOR CLEANING A POLYMERISATION REACTOR

(71) Applicant: WACKER CHEMIE AG, Munich (DE)

(72) Inventors: Hans-Peter Weitzel, Reischach (DE); Robert Braunsperger, Emmerting (DE)

(73) Assignee: WACKER CHEMIE AG, Munich (DE)

( * ) Notice: Subject to any disclaimer, the term of this patent is extended or adjusted under 35 U.S.C. 154(b) by 328 days.

(21) Appl. No.: 17/265,065

(22) PCT Filed: May 10, 2019

(86) PCT No.: PCT/EP2019/062055
§ 371 (c)(1),
(2) Date: Feb. 1, 2021

(87) PCT Pub. No.: WO2020/228927
PCT Pub. Date: Nov. 19, 2020

(65) Prior Publication Data
US 2022/0073654 A1 Mar. 10, 2022

(51) Int. Cl.
C08F 210/02 (2006.01)
C08F 2/00 (2006.01)
C08F 2/24 (2006.01)
C08F 6/16 (2006.01)
C08F 218/08 (2006.01)

(52) U.S. Cl.
CPC ............... C08F 2/008 (2013.01); C08F 2/24 (2013.01); C08F 6/16 (2013.01); C08F 2/002 (2013.01); C08F 210/02 (2013.01); C08F 218/08 (2013.01)

(58) Field of Classification Search
None
See application file for complete search history.

(56) References Cited

U.S. PATENT DOCUMENTS

| | | | |
|---|---|---|---|
| 4,038,473 A | 7/1977 | Cohen | |
| 4,661,569 A | 4/1987 | Kleine et al. | |
| 4,863,524 A * | 9/1989 | Komabashiri | B01J 19/002 526/74 |
| 4,904,309 A | 2/1990 | Komabashiri et al. | |
| 5,064,917 A | 11/1991 | Amano et al. | |
| 5,633,334 A | 5/1997 | Walker et al. | |
| 6,274,690 B1 | 8/2001 | Hoshida et al. | |
| 6,722,377 B1 * | 4/2004 | Bruce | C11D 7/5013 134/22.17 |
| 8,193,104 B2 | 6/2012 | Parsons et al. | |
| 2006/0130870 A1 | 6/2006 | Cai et al. | |
| 2014/0148561 A1 | 5/2014 | Paul et al. | |
| 2018/0002467 A1 * | 1/2018 | Babar | C08F 2/22 |

FOREIGN PATENT DOCUMENTS

| | | | |
|---|---|---|---|
| DE | 19856590 A1 | 6/2000 | |
| DE | 10126560 C1 | 9/2002 | |
| EP | 0057433 A1 | 8/1982 | |
| EP | 0248681 A2 | 12/1987 | |
| EP | 0152115 B1 | 2/1989 | |
| EP | 0248681 B1 | 12/1992 | |
| EP | 0633061 A1 | 1/1995 | |
| EP | 924229 A1 * | 6/1999 | .......... C08F 255/026 |
| EP | 0924229 A1 | 6/1999 | |
| EP | 1230019 B1 | 6/2005 | |
| EP | 1579050 B1 | 10/2012 | |
| EP | 2689838 A1 | 1/2014 | |
| EP | 2658644 B1 | 2/2017 | |
| EP | 3351612 A1 | 7/2018 | |
| EP | 3256497 B1 | 9/2018 | |
| WO | 9829186 A1 | 7/1998 | |
| WO | 0134293 A1 | 5/2001 | |
| WO | 2020228927 A1 | 11/2020 | |

OTHER PUBLICATIONS

M.K. Lindemann, "Vinyl Acetate Polymers", Encyclopedia of Polymer Science and Technology, John Wiley & Sons, 1971, vol. 15, pp. 577-595. XP055974409.
Bartholome, E. et al., "Polyacryl- und Polymethacryl-Verbindungen [Polyacrylic compounds to Mercury]", Ullmanns Encyklopädie der technischen Chemie [Ullmann's Encyclopaedia of Industrial Chemistry], 1980, vol. 19, p. 18. XP055974414.
"Thermal Transitions of Homopolymers: Glass Transition & Melting Point", Polymer Products from Aldrich, (Jan. 1, 2013), pp. 52-53. XP055974425.
Technical Datasheet "Aerotex® NMA Monomer 48%", allnex, 2018. XP055974428.
Technical Data Sheet "VeoVa™ 10 Monomer", Hexion, 2016. XP055974432.
German Standard DIN ISO 4576:1996, 2001. XP055974434.

(Continued)

*Primary Examiner* — Richard A Huhn
(74) *Attorney, Agent, or Firm* — BROOKS KUSHMAN P.C.

(57) ABSTRACT

A polymerization reactor for producing aqueous polymer dispersions by radically initiated emulsion polymerization of one or more ethylenically unsaturated monomers in the presence of one or more protective colloids and/or emulsifiers, is cleaned by initially charging an aqueous mixture comprising one or more ethylenically unsaturated monomers, one or more protective colloids and/or emulsifiers, but no oxidation initiator, the proportion of ethylenically unsaturated monomers being 20 to 70% by weight of the aqueous mixture, heating the aqueous mixture to a temperature of 50° C. to 100° C. for 5 minutes to 3 hours, adding one or more initiators and optionally further starting materials, initiating polymerization, removing the aqueous polymer dispersion thus obtained from the polymerization reactor and post-treating the dispersion to remove wall deposits detached during the process.

5 Claims, No Drawings

(56) References Cited

OTHER PUBLICATIONS

Technical Datasheet Gohsenol, Mitsubishi Chemical, 2022, URL: www.gohsenol.com/doc_e/gnrl/gnrl_01/gnrl_05.shtml.
M. Junk, Declaration, 2022.
Encyclopedia of Polymer Science and Engineering, 1987, vol. 8, John Wiley and Sons, pp. 659-677, USA.

* cited by examiner

METHOD FOR CLEANING A POLYMERISATION REACTOR

CROSS REFERENCE TO RELATED APPLICATIONS

This application is the U.S. National Phase of PCT Appln. No. PCT/EP2019/062055 filed May 10, 2019, the disclosure of which is incorporated in its entirety by reference herein.

BACKGROUND OF THE INVENTION

1. Field of the Invention

The invention relates to a process for cleaning a polymerization reactor which is used for producing aqueous polymer dispersions by means of radically initiated emulsion polymerization of radically polymerizable ethylenically unsaturated monomers.

2. Description of the Related Art

Aqueous polymer dispersions are used as binders in a wide range of applications, for example in adhesives, coating applications, as binders in carpet, textile and paper applications, and in construction chemical products such as tile adhesives, renders and sealants. These aqueous dispersions are usually produced by aqueous emulsion polymerization, either batchwise (discontinuously) in stirred polymerization reactors or also continuously in stirred tank cascades. The process efficiency is limited by the dissipation of the released heat via cooling surfaces, for example cooling coils and reactor walls.

Heat dissipation is also limited by the formation of wall deposits, known as fouling. These wall deposits consists essentially of polymer which is not sufficiently stabilized in the polymerization process and which is deposited on the surfaces of the reactor inner wall or the internals. In order to improve heat dissipation, the reactors therefore have to be laboriously cleaned after one or more batches in the case of batch polymerization, for example with organic solvents or purely mechanically by high-pressure cleaning with water under high pressure.

To prevent wall deposits, the interior of the polymerization reactor and the surfaces of its internals can be coated with a scale inhibitor, as described in EP 0152115 B1 and EP 3256497 B1. The disadvantage here is the cost of coating and the risk of contamination of the polymerization product with the anti-fouling coating agent.

Mechanical methods are known for removing wall deposits that have already formed. U.S. Pat. No. 6,274,690 B1 proposes cleaning the reactor inner walls with a water jet. EP 2689838 A1 describes a process for polymerization in which inert abrasive particles are added to the polymerization mixture to prevent the formation of deposits during the polymerization. In the continuous polymerization process in a tubular reactor of EP 2658644 B1, the reactor inner surfaces are cleaned with scrapers and wipers. In the method of WO 98/29186 A1, the reactor walls are set in vibration to prevent the formation of deposits. US 2006/0130870 A1 describes a method for cleaning the walls of a polymerization reactor by means of treatment with low-frequency sound waves. Disadvantages of these mechanical processes are the outlay on equipment and the risk of deposits forming on the reactor internals required for these processes.

The interior of polymerization reactors can also be cleaned with chemical agents. In U.S. Pat. No. 4,038,473, the wall deposits formed during polymerization of vinyl chloride is removed with a hot alkaline detergent solution. In the method of EP 0057433 A1, an aqueous surfactant solution with polyvalent metal salts is used for cleaning. EP 0633061 A1 describes continuous emulsion polymerization in a tubular reactor, the reactor being cleaned with a surfactant solution. U.S. Pat. No. 4,904,309 also uses a surfactant solution for cleaning. In EP 3351612 A1, the polymerization reactor is rinsed with a non-ionic surfactant solution. EP 1230019 B1 describes emulsion polymerization in a loop reactor, in which the polymerization reactor is cleaned with water and the wash water is reused in the polymerization. According to EP 0248681 B1, a combination of soap formers such as alkali metal silicates or alkali metal phosphates, an alkali such as alkali metal hydroxide or alkali metal carbonate, a surfactant and an organic solvent such as xylene or toluene, optionally in combination with a monomer, is used to clean the interior of the reactor. The disadvantage of chemical cleaning processes is the time required for cleaning and the risk of contamination of the products with the constituents of the washing solutions.

The object was therefore to provide an improved process for cleaning reactors which are used for producing aqueous polymer dispersions, with which polymer wall deposits are effectively removed, and which ensures improved plant availability (shorter downtime due to cleaning) and less waste due to cleaning solutions.

SUMMARY OF THE INVENTION

The invention relates to a process for cleaning a polymerization reactor for producing aqueous polymer dispersions by means of radically initiated emulsion polymerization of one or more ethylenically unsaturated monomers in the presence of one or more protective colloids and/or emulsifiers, characterized in that an aqueous mixture is initially charged in the polymerization reactor which comprises one or more ethylenically unsaturated monomers, one or more protective colloids and/or emulsifiers and does not comprise an oxidation initiator, wherein the proportion of ethylenically unsaturated monomers is 20 to 70% by weight, based on the total weight of the aqueous mixture, then the aqueous mixture is heated to a temperature of 50° C. to 100° C., and the polymerization reactor is treated with the aqueous mixture for 5 minutes to 3 hours, then one or more initiators and optionally further starting materials are added, then the polymerization is initiated, and the aqueous polymer dispersion thus obtained is removed from the polymerization reactor and is post-treated to remove the wall deposits detached during the treatment.

DETAILED DESCRIPTION OF THE PREFERRED EMBODIMENTS

The preparation of aqueous polymer dispersions by means of radically initiated emulsion polymerization has been described many times and is known to those skilled in the art; for example in Encyclopedia of Polymer Science and Engineering, Vol. 8 (1987), John Wiley and Sons, pp. 659-677.

The ethylenically unsaturated monomers are preferably selected from the group comprising vinyl esters, (meth)acrylic esters, vinyl aromatics, olefins and vinyl halides and optionally other monomers copolymerizable therewith. Suitable vinyl esters are those of carboxylic acids having 1 to 18 carbon atoms. Preference is given to vinyl acetate, vinyl propionate, vinyl butyrate, vinyl 2-ethylhexanoate, vinyl laurate, 1-methylvinyl acetate, vinyl pivalate, and vinyl esters of alpha-branched monocarboxylic acids having 9 to 11 carbon atoms, for example VeoVa9® or VeoVa10® (trade names of Hexion). Particular preference is given to vinyl acetate. Suitable monomers from the group of acrylic esters or methacrylic esters are, for example, esters of unbranched or branched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate. Preferred vinyl aromatics are styrene, methylstyrene and vinyltoluene. Preferred olefins are ethylene, propylene and butadiene. The preferred vinyl halide is vinyl chloride.

Particular preference is given to comonomer mixtures comprising vinyl acetate and 1 to 40% by weight ethylene; and
mixtures comprising vinyl acetate and 1 to 40% by weight ethylene and 1 to 50% by weight of one or more further comonomers from the group comprising vinyl esters having 3 to 15 carbon atoms in the carboxylic acid radical such as vinyl propionate, vinyl laurate, vinyl esters of alpha-branched carboxylic acids having 9 to 11 carbon atoms such as VeoVa9, VeoVa10, VeoVa11; and
mixtures comprising vinyl acetate, 1 to 40% by weight ethylene, and preferably 1 to 60% by weight acrylic esters of unbranched or branched alcohols having 1 to 15 carbon atoms, in particular n-butyl acrylate or 2-ethylhexyl acrylate; and
mixtures comprising 30 to 75% by weight vinyl acetate, 1 to 30% by weight vinyl laurate or vinyl esters of an alpha-branched carboxylic acid having 9 to 11 carbon atoms, and also 1 to 30% by weight acrylic esters of unbranched or branched alcohols having 1 to 15 carbon atoms, in particular n-butyl acrylate or 2-ethylhexyl acrylate, which comprise an additional 1 to 40% by weight ethylene;
and mixtures comprising vinyl acetate, 1 to 40% by weight ethylene and 1 to 60% by weight vinyl chloride; in which the mixtures can optionally also comprise further monomers, and wherein the figures in % by weight in each case add up to 100% by weight.

Suitable protective colloids are, for example, partially saponified polyvinyl alcohols; polyvinyl pyrrolidones; polyvinyl acetals; polysaccharides in water-soluble form such as starches (amylose and amylopectin), celluloses and carboxymethyl, methyl, hydroxyethyl, hydroxypropyl derivatives thereof; proteins such as casein or caseinate, soy protein, gelatin, lignosulfonates; synthetic polymers such as poly(meth)acrylic acid, copolymers of (meth)acrylates with carboxyl-functional comonomer units, poly(meth)acrylamide, polyvinylsulfonic acids and water-soluble copolymers thereof; melamine formaldehyde sulfonates, naphthalene formaldehyde sulfonates, styrene maleic acid and vinyl ether maleic acid copolymers; cationic polymers such as polydiallyldimethylammonium chloride (poly-DADMAC). Preference is given to partially saponified polyvinyl alcohols having a degree of hydrolysis of 80 to 95 mol % and a Höppler viscosity in 4% aqueous solution of 1 to 30 mPas (Höppler method at 20° C., DIN 53015).

Suitable emulsifiers are, for example, anionic and/or non-ionic emulsifiers. Examples of anionic emulsifiers are alkyl sulfates having a chain length of 8 to 18 carbon atoms, alkyl or alkylaryl ether sulfates having 8 to 18 carbon atoms in the hydrophobic radical and up to 40 ethylene oxide or propylene oxide units, alkyl or alkylaryl sulfonates having 8 to 18 carbon atoms, esters and semiesters of sulfosuccinic acid with monohydric alcohols. Examples of non-ionic emulsifiers are $C_{12}$-$C_{14}$-fatty alcohol ethoxylates having a degree of ethoxylation of 2 to 20 ethylene oxide units.

The protective colloids and/or emulsifiers are generally used in a total amount of 1 to 20% by weight, based on the total weight of the monomers, in the pre-treatment or the polymerization.

In the cleaning according to the invention, the water, the monomers and the protective colloids and/or emulsifiers are initially charged in the polymerization reactor as an aqueous mixture, and this mixture is agitated in the polymerization reactor, preferably with stirring. The monomer content in the aqueous mixture is generally 25 to 70% by weight, preferably 30 to 70% by weight, particularly preferably 40 to 70% by weight, based in each case on the total weight of the aqueous mixture. The higher the monomer content in the mixture, the more effectively the polymeric wall deposits are dissolved due to swelling and dissolution of the polymer in the monomer. The upper limit for the monomer content here can be set so that the emulsion does not switch from oil-in-water to water-in-oil. The protective colloid and/or the emulsifier are preferably used in the initial charge already in the amounts required for the polymerization. No oxidation initiator is initially charged. Preferably, neither oxidation initiator nor reduction initiator is initially charged.

The fill level of the aqueous mixture in the polymerization reactor is generally 40 to 95% by volume, preferably 50 to 95% by volume, more preferably 70 to 95% by volume, based in each case on the reactor volume.

The aqueous mixture is heated, preferably with stirring, to a temperature of 50° C. to 100° C., preferably to a temperature of 70° C. to 100° C., more preferably to 80 to 100° C. The temperature is selected so that boiling of the mixture and premature polymerization is avoided. Optionally, the treatment can also be carried out under pressure.

After reaching the desired temperature, the polymerization reactor is treated (cleaned) with the aqueous mixture, preferably with stirring, generally over a period of 5 minutes to 3 hours, preferably 10 minutes to 2 hours, particularly preferably 20 minutes to 1 hour.

After this treatment is complete, the aqueous mixture can optionally be cooled. The mixture can optionally be diluted with water. Monomers, protective colloid and/or emulsifier or further starting materials, for example buffers or regulators, can also optionally be added.

To initiate the polymerization, the initiator is added to the aqueous mixture and the aqueous mixture is heated to the polymerization temperature.

The polymerization is initiated with the customary initiators for emulsion polymerization, in particular redox initiator combinations of oxidation initiator and reduction initiator. Examples of suitable oxidation initiators are the sodium, potassium and ammonium salts of peroxodisulfuric acid, hydrogen peroxide and azobisisobutyronitrile. Preference is given to the sodium, potassium and ammonium salts of peroxydisulfuric acid and hydrogen peroxide. The oxidation initiators mentioned are generally used in an amount from 0.01 to 2.0% by weight, based on the total weight of the monomers.

Suitable reducing agents (reduction initiators) are, for example, the sulfites and bisulfites of alkali metals and of ammonium, for example sodium sulfite; the derivatives of sulfoxylic acid such as zinc or alkali metal formaldehyde sulfoxylates, for example sodium hydroxymethanesulfinate (Bruggolite) and ascorbic acid, isoascorbic acid or salts thereof; or formaldehyde-free reducing agents such as 2-hydroxy-2-sulfinato acetic acid disodium salt (Bruggolite FF6). The amount of reduction initiator is preferably 0.015 to 3% by weight, based on the total weight of the monomers.

The polymerization is effected under conditions typical for emulsion polymerization. The polymerization temperature is preferably between 50° C. and 110° C. The pressure depends on whether the monomers to be polymerized are liquid or gaseous at the particular polymerization temperature and is preferably 1 to 110 $bar_{abs}$. In the copolymerization of gaseous comonomers such as ethylene, 1,3-butadiene or vinyl chloride, polymerization takes place under pressure, and particularly preferably 10 to 80 $bar_{abs}$.

After polymerization is complete, the product mixture is removed from the polymerization reactor and optionally post-treated by degassing, post-polymerization and/or stripping. The polymer dispersion thus obtained comprises the wall deposits detached during cleaning. The polymer dispersion is therefore post-treated, preferably filtered, to remove the detached wall deposits. After the post-treatment, the polymer dispersion preferably has the specification of a polymer dispersion obtained without pre-treatment and can be mixed with conventionally obtained batches for storage.

After filling this cleaning batch and optionally after rinsing with water, the polymerization reactor is in a cleaned condition and immediately ready for use again.

The frequency of cleaning with the process according to the invention depends on specific circumstances, such as the volume of the reactor internals, product portfolio (composition of the monomer batches), susceptibility to contamination (depending on the colloid stability or shear stability of the polymers produced). The process according to the invention is preferably used before the reactor is extremely fouled with polymeric wall deposits, since otherwise the cleaning effect will decrease and the filtration effort increases. The extent of the wall deposits formed during the polymerization or during two or more consecutive polymerizations can be measured by means of the decrease in the cooling capacity of the polymerization reactor. In the case of a clean polymerization reactor without polymer wall deposits, the cooling capacity is 100%. With increasing formation of polymer wall deposits, the cooling capacity decreases approximately proportionally.

The cooling capacity Q* generally corresponds at least to the heat of polymerization released and is measured in kilowatts (kW). The cooling capacity Q* is defined by the following relationship:

$$Q^* = \alpha^* A^* \Delta T, \text{ where}$$

α=heat transfer coefficient [W/(m²K)], A=heat exchange surface [m²], ΔT=temperature difference [K] (difference between reactor temperature and cooling water temperature). The exchange surface is constant and does not change. The heat transfer coefficient is generally not precisely known and deteriorates due to formation of wall deposits. In order to achieve the same cooling capacity again, the ΔT must therefore be correspondingly larger if the cooling capacity deteriorates.

The percentage change in ΔT thus approximately corresponds to the change in the cooling capacity due to the deterioration in the heat transfer coefficient α. If, for example, the temperature difference ΔT increases from 10° C. to 11° C., the cooling capacity is only 10/11=90.9% of the initial cooling capacity without formation of wall deposits.

The process according to the invention is preferably used when the polymerization reactor exhibits only 50 to 95% of the initial cooling capacity due to fouling (formation of wall deposits), more preferably only 60 to 90% of the initial cooling capacity, most preferably only 70 to 85% of the initial cooling capacity.

The aim of the process according to the invention is that, after applying the cleaning process according to the invention, more than 95% of the initial cooling capacity without wall deposits is again obtained.

The process according to the invention is preferably suitable for cleaning polymerization reactors which are used for batch polymerization. In the case of batch polymerization, the polymerization reactor is filled with the reactants, the polymerization is carried out, and the reactor is emptied. For the next batch, the polymerization reactor is refilled, polymerized and emptied again when the polymerization is complete. The process according to the invention can be used for cleaning polymerization reactors after one or more batches, preferably after 20 to 30 batches, of a batch polymerization process.

In the procedure according to the invention, time losses caused by cleaning the polymerization reactor are reduced to a minimum. A further advantage is that there is no waste due to cleaning agents such as organic solvents. It is particularly advantageous that product is also produced in the polymerization step following the cleaning step and no waste is produced.

The following examples serve to further elucidate the invention:

General polymerization procedure (batch 1):

The following components were initially charged in a ca. 600 liter volume pressure reactor:

115 kg of water,
  105 kg of a 20% by weight polyvinyl alcohol solution of a partially saponified polyvinyl alcohol having a degree of hydrolysis of 88 mol % and a Höppler viscosity of 4 mPas (Höppler method according to DIN 53015 at 20° C. and in 4% aqueous solution),
  11 kg of a 10% by weight polyvinyl alcohol solution of a partially saponified polyvinyl alcohol having a degree of hydrolysis of 88 mol % and a Höppler viscosity of 25 mPas,
  70 g of an 85% aqueous solution of formic acid,
  80 g of a 10% aqueous iron ammonium sulfate solution.

The reactor was evacuated, then 220 kg of vinyl acetate were added to the aqueous initial charge. The reactor was then heated to 55° C. and subjected to an ethylene pressure of 32 bar (corresponding to an amount of 28 kg of ethylene).

The polymerization was started by adding 3% by weight aqueous potassium persulfate solution at a rate of 1.5 kg/h and by adding 1.5% by weight aqueous sodium hydroxymethanesulfinate solution (Bruggolite) at a rate of 1.5 kg/h. After observing the start of the polymerization, the internal temperature was increased to 85° C. over the course of 30 minutes. From the start of the reaction, the pressure was increased to 55 bar and maintained until a further 10 kg of ethylene had been metered in. The ethylene valve was then closed and the pressure allowed to drop. After reaching the polymerization temperature of 75° C., a further 55 kg of vinyl acetate were metered in over the course of 2 hours and the initiator rates were increased to a rate of 2.0 kg/h to 2.5 kg/h. After the vinyl acetate had been metered in, the initiators ran for a further 60 minutes to polymerize the batch.

The total polymerization time was ca. 5 hours, the average heat output of the polymerization was ca. 28 kW. The jacket inlet temperature (cooling water temperature), to maintain the desired polymerization temperature (reactor temperature) of 85° C., was a minimum of 77° C. The temperature difference ΔT was consequently 8° C.

The dispersion was then transferred to an unpressurized reactor for separation and setting, where it was post-polymerized by adding 500 g of a 10% by weight aqueous solution of tert-butyl hydroperoxide and 145 g of a 10% by weight aqueous solution of Bruggolite. The pH was adjusted to ~4.5 by adding aqueous sodium hydroxide solution (10% by weight aqueous solution). The pressure reactor was then rinsed with 15 kg of water.

Product Properties:
Solids content: 57.9%
pH: 4.5
Viscosity (Brookfield at 23° C. and 20 rpm): 1800 mPas
Particle size Dw (Beckmann Coulter): 1.2 μm
Glass transition temperature Tg (DSC according to ISO 11357): 16° C.

Repetition of the General Polymerization Procedure (Batches 2 to 20):

The polymerization according to the general procedure was repeated 19 times, the polymerization reactor only being rinsed with water between each batch and not being cleaned any further.

After the 20th batch, a drop in the jacket inlet temperature to 72° C. was observed with the same polymerization time per batch and the same heat output of 28 kW per batch. The difference with respect to the polymerization temperature was thus ΔT=13° C. and was significantly higher than in the clean state of the reactor (batch 1) at ΔT=8° C. The increase in ΔT from 8° C. to 13° C. corresponds to a decrease in the cooling capacity to 8/13=61.5% of the initial cooling capacity without wall deposits.

Example of the Process According to the Invention: Cleaning Batch (Batch 21):

The reactor was filled with water, polyvinyl alcohol solution, formic acid solution, iron ammonium sulfate solution, vinyl acetate and ethylene as described in the general procedure. The mixture present in the reactor was then heated to 85° C. and stirred at this temperature for 30 minutes. The reactor contents were then cooled again to 55° C. by means of jacket cooling.

The polymerization was then started by adding 3% by weight aqueous potassium persulfate solution at a rate of 1.5 kg/h and by adding 1.5% by weight aqueous sodium hydroxymethanesulfinate solution (Bruggolite) at a rate of 1.5 kg/h, and the polymerization as described in the general procedure was carried out.

By means of this approach in accordance with the cleaning process according to the invention, it was observed that the jacket inlet temperature required to maintain the desired polymerization temperature of 85° C. was a minimum of 76.7° C. There was therefore a difference of ΔT=8.3° C., comparable to the difference in batch 1 of ΔT=8° C. This temperature behavior indicates that the reactor has been returned to a clean condition by the procedure according to the invention. The cooling capacity quotient 8/8.3=96.4% shows that, after cleaning, 96.4% of the initial cooling capacity without wall deposits was obtained again. This means that the wall deposits have been almost completely detached with the treatment according to the invention.

Due to the detached wall deposits present in this batch, this batch was separated and carefully filtered from the detached reactor wall deposits. The product obtained thereafter has the same product properties as described for batch 1. The dispersion was then mixed into the products from batch 1 to batch 20.

The invention claimed is:

1. A process for cleaning a polymerization reactor for producing aqueous polymer dispersions by means of radically initiated emulsion polymerization of one or more ethylenically unsaturated monomers in the presence of one or more protective colloids and/or emulsifiers, comprising:
   initially charging an aqueous mixture to the polymerization reactor, the aqueous mixture comprising one or more ethylenically unsaturated monomers, one or more protective colloids and/or emulsifiers, but no oxidation initiator, wherein the proportion of ethylenically unsaturated monomers is 20 to 70% by weight, based on the total weight of the aqueous mixture,
   heating the aqueous mixture to a temperature of 50° C. to 100° C., and treating the polymerization reactor with the aqueous mixture for 5 minutes to 3 hours,
   adding one or more initiators and optionally further starting materials, removing and the aqueous polymer dispersion thus obtained from the polymerization reactor and post-treating the aqueous polymer dispersion to remove wall deposits detached during the process, wherein the process is carried out when the polymerization reactor exhibits 50 to 95% of the original cooling capacity without wall deposits.

2. The process of claim 1, wherein neither the oxidation initiator nor reduction initiator are initially charged in the aqueous mixture.

3. The process of claim 1, wherein the process is carried out after one or more batches of a batch polymerization process.

4. The process of claim 1, wherein the process is carried out after 20 to 30 batches of a batch polymerization process.

5. The process of claim 1, wherein the polymerization reactor is treated with the aqueous mixture for 20 minutes to 1 hour.

* * * * *